United States Patent [19]

Soto

[11] Patent Number: 4,627,278
[45] Date of Patent: Dec. 9, 1986

[54] ILLUMINATED WIND SOCK

[76] Inventor: Henry L. Soto, 2030 Mission St., San Francisco, Calif. 94110

[21] Appl. No.: 727,321

[22] Filed: Apr. 25, 1985

[51] Int. Cl.⁴ .............................................. G01W 1/00
[52] U.S. Cl. ...................................... 73/188; 116/173; 340/949
[58] Field of Search ............... 73/188, 189; 116/63 C, 116/173, DIG. 5; 340/949

[56] References Cited

U.S. PATENT DOCUMENTS

| | | | |
|---|---|---|---|
| 1,913,672 | 6/1933 | Huking | 116/173 X |
| 2,404,933 | 7/1946 | Stockstrom | 73/188 |
| 4,274,705 | 6/1981 | Miller . | |
| 4,287,427 | 9/1981 | Scifres . | |
| 4,306,547 | 12/1981 | Lowell . | |
| 4,481,505 | 11/1984 | Thompson | 73/188 |
| 4,486,754 | 12/1984 | Guggemos | 340/949 |
| 4,553,430 | 11/1985 | Behrens | 73/188 |

Primary Examiner—Charles A. Ruehl
Attorney, Agent, or Firm—Henderson & Sturm

[57] ABSTRACT

An illuminated wind sock apparatus comprising a wind sock unit (11) provided with at least one interior light source (19, 21) that transmits light to a plurality of fiber optic members (22) disposed on the exterior of the wind sock unit (11).

3 Claims, 5 Drawing Figures

ILLUMINATED WIND SOCK

TECHNICAL FIELD

The present invention relates generally to wind sock constructions for airfields.

BACKGROUND OF THE INVENTION

One of the most common structural elements found at airfields is a wind sock. This element is normally mounted on a post at an elevated location, and comprises a hollow tapered tube of light-weight, flexible material, which fills with air at the slightest breeze. The forward end of the wind sock is also normally provided with a swivel, and the wind sock is further provided with high visibility coloration; so that pilots approaching an airfield may readily observe and make note of which direction the wind is coming from to assist them in landing the aircraft.

While the foregoing general structural arrangement for a wind sock is adequate for daytime operations; the standard procedure for rendering a wind sock visible during night time conditions is to provide the wind sock with a remote eternal source of illumination such as a bank of floodlights or the like.

The primary reason that a bank of floodlights is normally required to illuminate the wind sock can be directly attributable to the fact that the wind sock to be effective must be large enough to be visible to a pilot at a substantial distance, coupled with the fact that the 360 degrees rotation of the windshield requires an arc of rotation that is beyond the capabilities of virtually all single illumination sources.

Having appreciated the enormous amount of energy required in the past to illuminate a relatively simple structure, alternate and less energy consuming solutions were sought to address this problem and the ultimate outcome of that research resulted in the development of the structure that forms the basis of the present invention.

SUMMARY OF THE INVENTION

The present invention relates in general to a wind sock construction containing its own source of illumination. The invention comprises in general a wind sock unit, and an illumination unit disposed within the wind sock unit and operatively associated with a fiber optic unit.

The wind sock unit may comprise any standard wind sock construction which includes a sock member, an elevated post member and a swivel member for operatively connecting the sock member to the post member.

The illumination unit may comprise a single or multiple light source, which may be disposed in either a stationary of relatively rotatable relationship with respect to the post member.

The fiber optic unit comprises a plurality of individual fiber strands that are disposed along the exterior sides of the wind sock and have one end positioned with respect to the light source such that the fiber optic strands disperse light along the longitudinal sides of the sock member.

BRIEF DESCRIPTION OF THE INVENTION

These and other objects, advantages, and novel features of the invention will become apparent from the detailed description of the best mode for carrying out the invention which follows, particularly when considered in conjunction with the accompanying drawings wherein.

BEST MODE FOR CARRYING OUT THE INVENTION

Figure 1:
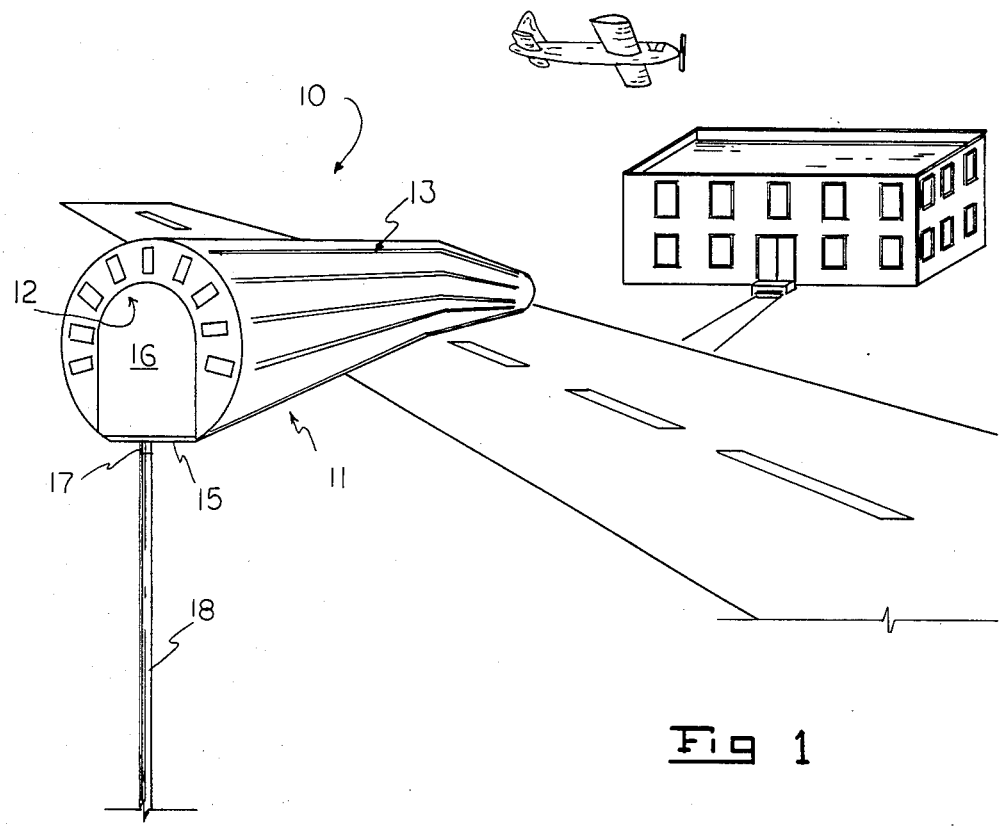
FIG. 1 is a perspective view of the wind sock apparatus of this invention in its normal environment.

As can be seen by reference to the drawings the basic apparatus that forms the basis of this invention is designated generally by the numeral 10. The apparatus (10) comprises in general a wind sock unit (11), an illumination unit (12) and a fiber optic unit (13). These units will now be described in seriation fashion.

The wind sock unit (11) comprises in general an elongated tapered tubular sock member (14) provided with a framework member (15) that rigidly supports the enlarged end (16) of the sock member (14) in a generally open mouthed fashion.

The framework member (15) is further provided with a swivel member (17) that is operatively connected to the upper end of an elevated pole member (18) to allow the sock member to rotate 360 degrees in the horizontal plane with respect to the pole member (18), in a well recognized fashion.

The illumination unit (12) comprises a single light source (19) used in an alternative version of the apparatus (10), or an array (20) of individual light sources (21) constitute the preferred embodiment, due to the redundancy factor.

The fiber optic unit (13) comprises in general a plurality of elongated fiber optic members (22) in the form of bundles, strands or cables that are capable of diffusing light along their running length. As can be seen by reference to the drawings, the elongated fiber optic members (22) are disposed on the external surface of the tapered sock member (14) and are generally aligned with the longitudinal axis of the sock member (14).

In both the preferred and alternate versions of the apparatus (10) each of the plurality of fiber optic members (22) have one end which extends into the interior (23) of the sock member (14), and is exposed to light rays emanating from the illumination unit (12).

Figure 2:
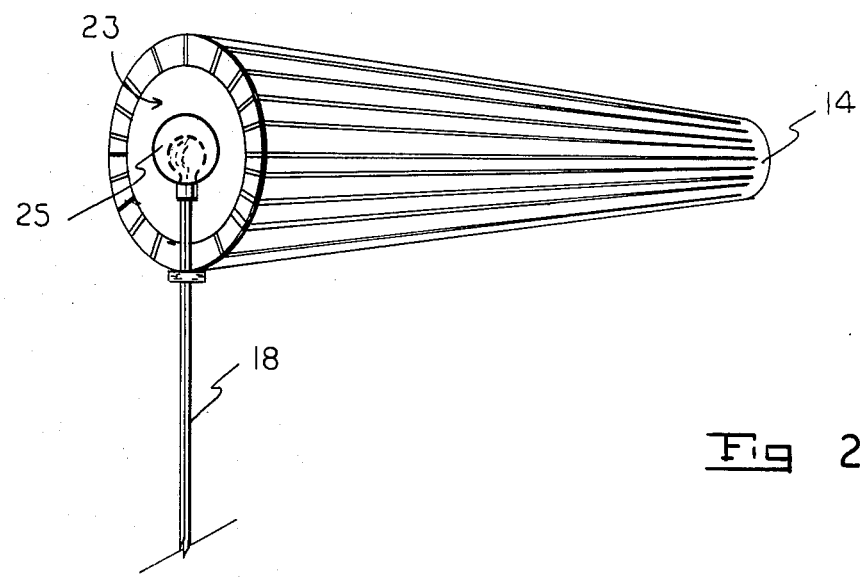
FIG. 2 is a perspective view of the single light source version of the apparatus.
Figure 3:
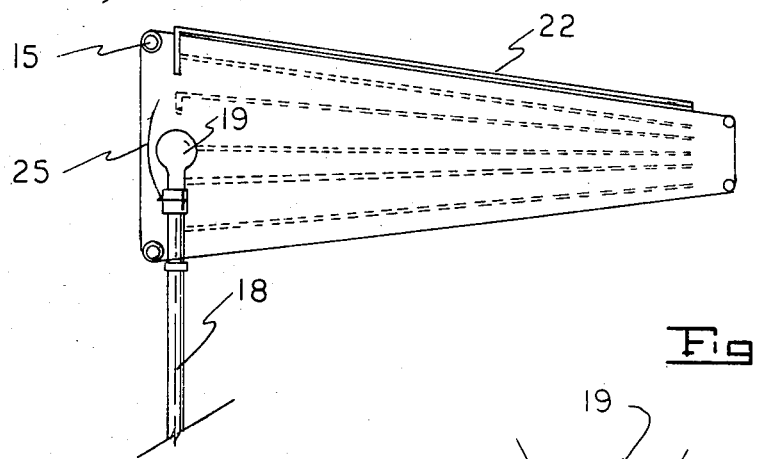
FIG. 3 is a cross-sectional view of the single light source version of the apparatus.
Figure 4:
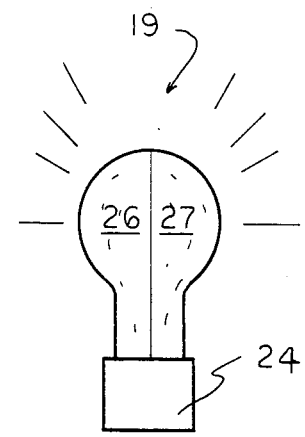
FIG. 4 is a detailed view of the single light source.

In the alternate version of the apparatus depicted in FIGS. 2 and 3, the single light source (19) comprises a light bulb (24) centrally disposed in the enlarged end (16) of the sock member (14). In this version, the light bulb (24) is mounted in a stationary fashion with respect to the pole member (18), and is provided with a light shield (25) that is operatively connected with the framework member (15), so that the light shield moves with the sock member (14) as it rotates, to prevent direct illumination from the light bulb (24) impinging upon the eyes of a pilot.

At this juncture, it should be noted that this invention further contemplates the fabrication of the sock member (14) from material that is partially light transmissive, as a result of a physical characteristic of the material itself, or the manner in which the material is formed (e.g. interstices in the fabric.)

In a variation of the alternative embodiment, the single light bulb will be mounted for relative rotation with respect to the pole member (18), and in this version the light shield (25) will be stationary with respect to the light bulb. In addition, the light bulb will be provided with colored halves 26 and 27 which will transmit different colored light through the opposite sides of the sock member (14).

Figure 5:
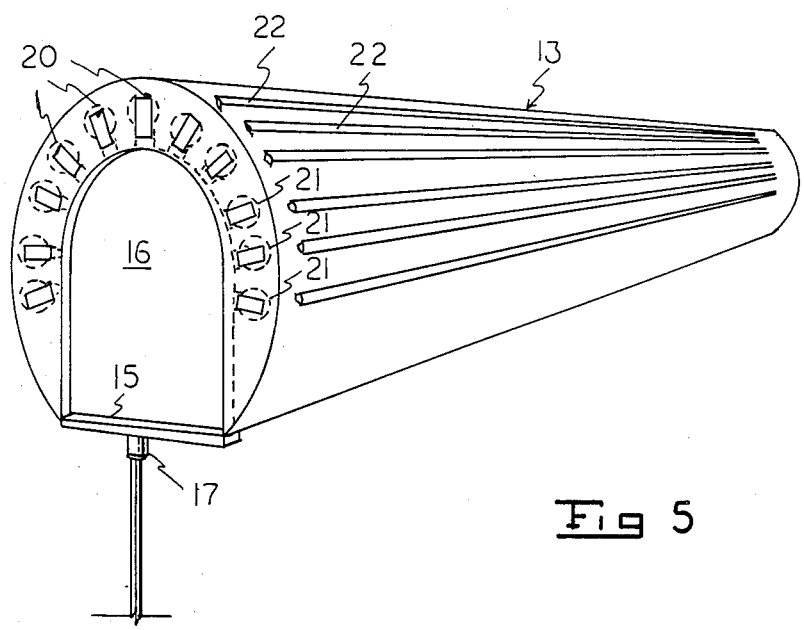
FIG. 5 is an enlarged perspective view of the multiple light source version of the apparatus.

In the preferred embodiment of this invention illustrated in FIG. 5, the illumination unit (12) comprises an array (20) of individual light sources (21) disposed in a spaced relationship around the upper periphery of the framework member (15). In this embodiment each one of the plurality of fiber optic members (22) will be exposed to the light emanating from at least a majority of the individual light sources (21) that constitute the individual light sources (21) that constitute the array (20).

As previously mentioned this arrangement is by far the safest arrangement; due to the fact that the failure of one or more individual light sources will not render the apparatus (10) inoperative for its intended purpose, and that eventually would only occur should the entire array become extinguished.

Having thereby described that many substitutions, modifications, and variations of the invention are possible in light of the above teachings. It is therefore to be understood that the invention, as taught and described herein, is only to be limited to the extent of the breadth and scope of the appended claims.

I claim:

1. An illuminated wind sock apparatus wherein the apparatus comprises:
    a wind sock unit including an elongated tapered tubular sock member mounted on a framework member which is rotatably disposed on a pole member;
    an illumination unit comprising at least one source of illumination disposed within the interior of the said tubular sock member; and
    a fiber optic unit comprising a plurality of fiber optic members disposed on the exterior of the tubular sock member and having one end exposed to the light emanating from said at least one source of illumination.

2. An apparatus as in claim 1 wherein, the said plurality of fiber optic members are elongated and generally aligned with the longitudinal axis of the sock member.

3. An apparatus as in claim 2 wherein the said sock member is partially light transmissive.

* * * * *